US006592965B1

(12) United States Patent
Gordon

(10) Patent No.: US 6,592,965 B1
(45) Date of Patent: *Jul. 15, 2003

(54) DUCTILE CERAMIC COMPOSITE ELECTROLYTE

(75) Inventor: Arnold Z. Gordon, Beachwood, OH (US)

(73) Assignee: IGR Enterprises, Inc., Beachwood, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 08/888,996

(22) Filed: Jul. 7, 1997

Related U.S. Application Data

(63) Continuation of application No. 08/717,616, filed on Sep. 20, 1993, now abandoned, which is a continuation of application No. 08/549,022, filed on Oct. 27, 1995, now abandoned, which is a continuation of application No. 08/372,895, filed on Jan. 13, 1995, now abandoned, which is a continuation of application No. 08/222,166, filed on Apr. 4, 1994, now abandoned, which is a continuation of application No. 07/944,713, filed on Sep. 11, 1992, now abandoned, which is a continuation of application No. 07/549,468, filed on Jul. 6, 1990, now abandoned.

(51) Int. Cl.[7] .............................. B32B 3/24; C25B 13/00
(52) U.S. Cl. .................... 428/134; 428/138; 428/135; 428/137; 428/140; 428/209; 428/210; 428/472; 501/94; 429/30; 429/33; 204/295; 204/421
(58) Field of Search ................................. 428/134, 135, 428/137, 140, 209, 210, 472, 138; 501/94; 429/30, 33; 204/295, 421

(56) References Cited

U.S. PATENT DOCUMENTS

| | | | |
|---|---|---|---|
| 3,233,985 A | | 2/1966 | Kraft et al. ................ 29/191.2 |
| 3,427,185 A | | 2/1969 | Chentham et al. .......... 117/93.1 |
| 3,794,551 A | | 2/1974 | Landingham et al. ......... 161/58 |
| 3,889,348 A | * | 6/1975 | Lemelson ................... 29/420.5 |
| 3,914,500 A | * | 10/1975 | Brennan et al. ............. 428/295 |
| 3,922,411 A | | 11/1975 | Motta et al. ................. 428/116 |
| 4,052,532 A | * | 10/1977 | Tannenberger et al. ........ 429/33 |
| 4,070,529 A | * | 1/1978 | Delmas et al. ............. 501/94 X |
| 4,234,638 A | | 11/1980 | Yamazoe et al. ............ 428/133 |
| 4,276,331 A | * | 6/1981 | Bothwell .................... 428/34.6 |
| 4,376,374 A | | 3/1983 | Bothwell ...................... 60/687 |
| 4,396,480 A | * | 8/1983 | Hegedus et al. ............... 429/33 |
| 4,462,891 A | * | 7/1984 | Lawless ................... 204/421 X |
| 4,478,904 A | * | 10/1984 | Ducheyne et al. ........... 428/288 |
| 4,572,754 A | | 2/1986 | Bloom ......................... 156/89 |
| 4,582,766 A | * | 4/1986 | Isenberg et al. ............... 429/30 |
| 4,636,291 A | | 1/1987 | Divisek et al. .............. 204/283 |
| 4,812,329 A | * | 3/1989 | Isenberg .................. 429/33 X |
| 5,006,494 A | * | 4/1991 | Virkar ..................... 204/421 X |
| 5,047,185 A | * | 9/1991 | Engel .......................... 264/60 |
| 5,211,776 A | * | 5/1993 | Weiman ...................... 148/525 |

FOREIGN PATENT DOCUMENTS

| | | | |
|---|---|---|---|
| EP | 0098518 | 1/1984 | ........... C25B/13/04 |
| EP | 0299788 | 1/1989 | ........... H01L/39/24 |
| EP | 0300215 | 1/1989 | ........... C04B/35/00 |

* cited by examiner

Primary Examiner—William P. Watkins, III
(74) Attorney, Agent, or Firm—Calfee, Halter & Griswold LLP

(57) ABSTRACT

A ductile, solid electrolyte composite comprising a continuous, ordered, repeating ductile metallic array surrounded by and supporting an ionically conductive ceramic matrix such as stabilized zirconia, bismuth and/or ceria oxides.

9 Claims, 5 Drawing Sheets

DUCTILE CERAMIC COMPOSITE ELECTROLYTE

This application is a continuation of application(s) Ser. No. 08/717,616 Filed Sep. 20, 1996, which is a continuation of Ser. No. 08/549,022 Filed Oct. 27, 1995, now abandoned, which is a continuation of Ser. No. 08/372,895 Filed Jan. 13, 1995, now abandoned, which is a continuation of Ser. No. 08/222,166 Filed Apr. 4, 1994, now abandoned, which is a continuation of Ser. No. 07/944,713 Filed Sep. 11, 1992, now abandoned which is a continuation of Ser. No. 07/549, 468 Filed Jul. 6, 1990, now abandoned.

BACKGROUND OF THE INVENTION

The present invention relates to a novel solid state ceramic composite electrolyte.

Ceramics generally possess a number of desirable properties, including markedly high resistance to abrasion, heat and corrosion compared to metallic materials. Certain ceramics, such as stabilized bismuth solid oxides, stabilized ceria solid oxides and zirconia solid oxides are ionically conductive materials suitable for use as solid electrolytes. However, due to extreme brittleness, their application has been limited despite their other excellent properties.

A number of attempts have been made to increase toughness of ceramic materials by compounding them with another material including ceramic or metal whiskers such as silicon carbide whiskers. Composites with ceramic matrices and ductile metal inclusions such as those produced by Lanxide Corporation show high fracture toughness when compared to ordinary ceramic materials. See for example U.S. Pat. Nos. 4,824,622; 4,847,220; 4,822,759; 4,820,461; and related U.S. Pat. No. 4,871,008. These composites are a chaotic, generally discontinuous, random metal dispersion in a ceramic composite body. They are prepared by a slow controlled oxidation of molten aluminum to alumina oxide, leaving behind approximately 5% of the parent metal. See also C. A. Anderson et al., Ceram. Eng. Sci. Proc., 9 [7–8] pp. 621–626 (1988); and M. S. Newkirk et al., Ceram. Eng. Sci. Proc., 8 [7–8] pp 879–885 (1987).

P. Ducheyne et al., J. Materials Science 17(1982) 595–606 discloses a bioglass composite produced by immersing premade porous fiber skeletons into molten bioglass to prepare metal fiber reinforced bioglass. These porous fiber skeletons produce random, chaotic, disordered support matrices and the process is applicable only to bioglasses.

U.S. Pat. No. 4,764,488 discloses a high toughness ceramic composite of the fiber-reinforced type wherein metal fibers having the shape of triangular waves forming bent portions alternating on the opposite sides with an angle Ō of the bent portions in a range between 60° and 165° and a d/H ration of between 0.025 and 0.6. While the discrete, discontinous fibers, unidirectionally anchored fiber reinforcement employed in the 488 patent improve the toughness of the ceramic, this technique does not solve the problem of crack propagation and ultimate failure.

U.S. Pat. No. 4,776,866 discloses a whisker-reinforced ceramic matrix composite comprising a principal crystal phase selected from the group consisting of anorthite, barium-stuffed cordierite and mixed cordierite/anthorite prepared by extrusion of ceramic batches comprising an extrusion vehicle and a solid component comprising essentially inorganic whiskers and powdered glass.

The novel composite employed in the practice of this invention is mechanically tough. When subjected to intentionally severe mechanical stress, such as bending a sheet in half and restraightening it, the crack that resulted was limited to the stress or fold line.

SUMMARY OF THE DISCLOSURE

The present invention provides a ductile solid electrolyte composite comprising a continuous, ordered, repeating ductile metallic array surrounded by and supporting an ionically conductive ceramic matrix. The preferred form of the solid electrolyte is a planar structure which can be fabricated into various configurations such as tubes, arcuate sections, corrugated structures or flat plates.

DETAILED DESCRIPTION OF PREFERRED EMBODIMENTS

The ductile, tough solid electrolyte ceramic composite employed in the practice of the present invention comprises a regular, ordered, continuous, repeating array of ductile intersupported or interconnected, metallic fibers in intimate contact with the ceramic matrix so as to be substantially surrounded or embedded within it and supporting the matrix. The ceramic employed in the practice of this invention is a highly ionically conductive material. Preferred ceramic phase materials in which the fibers are embedded or surrounded are solid oxide electrolytes based on solid solutions of zirconia oxide, bismuth oxide or ceria oxides stabilized with a second component selected from a metal oxide wherein the metal ion has a valence of +2, +3, +5, or +6.

Other suitable solid oxide electrolytes include, but are not limited to hafnia (HfO), titania ($TiO_2$), other lanthanides such as ceria ($CeO_2$), samaria ($Sm_2O_3$), yttria ($Y_2O_3$), erbia ($Er_2O_3$), scandia ($ScO_2$), perovskites, pyrochlores, calia ($CaO_2$), magnesia (MgO), gadolinia ($Gd_2O_3$) or a combination of one or more of the above oxides.

The preferred electrolyte phase is stabilized solid oxides. Preferred stabilized solid oxides include yttria stabilized zirconia, gadolinia stabilized ceria, baria stabilized bismuth oxide, erbia stabilized bismuth oxide, In one preferred embodiment, ceramic composites were prepared from 8 mole percent ytterbia stabilized zirconia and 9 mole percent yttria-stabilized zirconia as the ceramic phase and compounded with planar 60 mesh square weave Inconel 600 or Inconel 600 expanded foil as the ductile phase/array to yield a sheet of solid oxide electrolyte composite suitable for a mechanically tough solid oxide fuel cell. This physical array allows for approximately 90% of the volume of the composite to be the solid electrolyte, resulting in a high level of ionic conductivity through the plane of the composite.

The ytterbia materials were prepared from an alkoxide based sol-gel formulation in accordance with one embodiment of the present invention.

In another preferred embodiment, bismuth baria rhombohedral system wherein the barium stabilized phase has a barium content of 15–25 mole percent of stabilizing oxide formula, preferably 15–20 mole percent, and most preferably 20 mole percent is employed as the ceramic phase of a solid electrolyte composite of the present invention suitable for use in fabricating cells for oxygen and nitrogen generators.

Ceria stabilized with a metal oxide wherein the metal ion has a valence of +2 or +3 may also be used in the practice of this invention as the ceramic phase of the solid electrolyte composite. Representative stabilizing agents are oxides of yttrium, scandium, gadolinium and other rare earth and alkaline earth matals.

Figure 1:
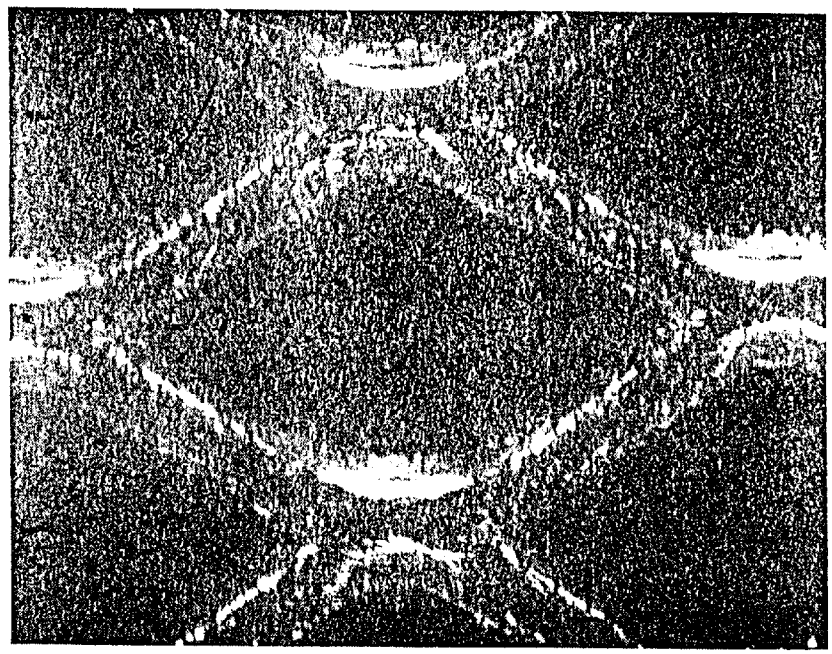
FIG. 1 is a 100× photomicrograph of the preferred embodiment of an open ductile array for the solid electrolyte ceramic composite employed in the practice of this invention.

As best shown in FIG. 1, a preferred embodiment of the ductile component of the solid electrolyte composite employed in the practice of this invention is an intersupported, planar array of metallic ligaments forming a repeating diamond pattern. The line of sight openess of this array is about 65–70%. Ceramic volume fraction of the solid electrolyte ceramic composite composition is from 10% to 95%. The preferred ceramic volume fraction of the final ceramic composite is about 90%.

The preferred material for the ordered, ductile array is a single layer of an open mesh metal structure. Especially preferred are expanded metal foils such as Haynes 214 expanded metal foil. Especially preferred is an expanded metal foil produced in accordance with this invention from a solid sheet of Inconel 600 foil with an original thickness of 0.003".

The solid electrolyte composite employed in the practice of this invention is a thin sheet-like structure having a thickness of 0.01 inch or less. It is preferred that the composite have a thickness of 0.003 inch or less. While one of the requirements of structures in which the composite is used, including an oxygen or nitrogen generator or fuel cell module, is that the components including the electrolyte composite be of sufficient mechanical strength to withstand stresses to which they will be exposed, this will normally dictate the thickness required. If very large sheets not laterally supported, as by current pickups in the form of posts used to prevent electrical shorts in multicell stack devices such as oxygen generators, are desired greater thickness may be required.

Generally speaking, shape of the composite body is irrelevant to its operation. It may be square, rectangular, circular, pleated corrugated, and the like. For best results it is preferred that the composite body employed in the electrolytic cell, which forms the essential element of the oxygen generator of this invention, is at least 4 inches on a side, preferably 6 inches or more in diameter if round to provide an equivalent surface area. Size will depend upon the end application. Portable oxygen generators for medical or other personal use, such as for firefighters, would use relatively small cells. For large, industrial applications, composite bodies having dimensions of 1 to 2 meters or more per side may be employed.

Figure 2:
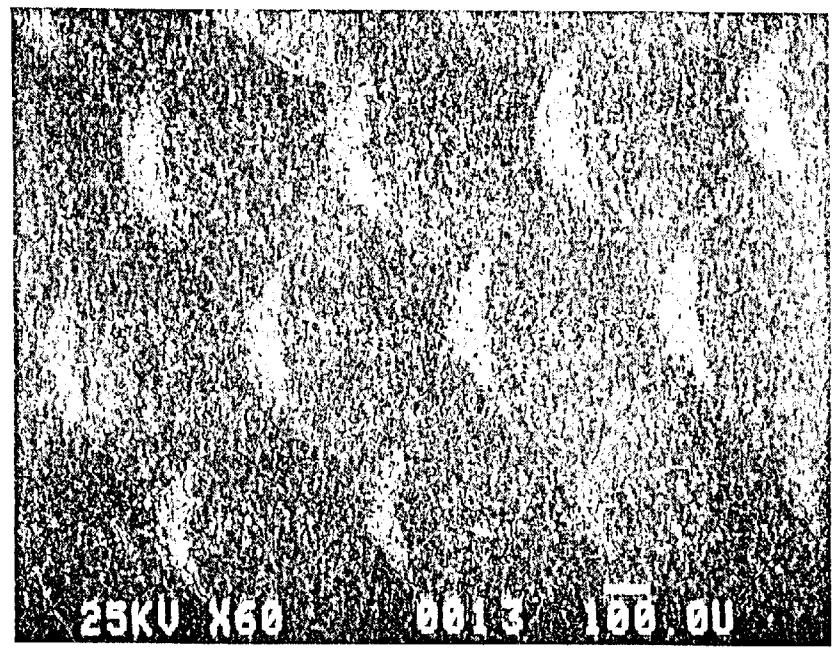
FIG. 2 is a 60× SEM of a preferred embodiment of solid electrolyte composite having a repeating pattern of the underlying diamond structure from the ductile array of FIG. 2.
Figure 5:
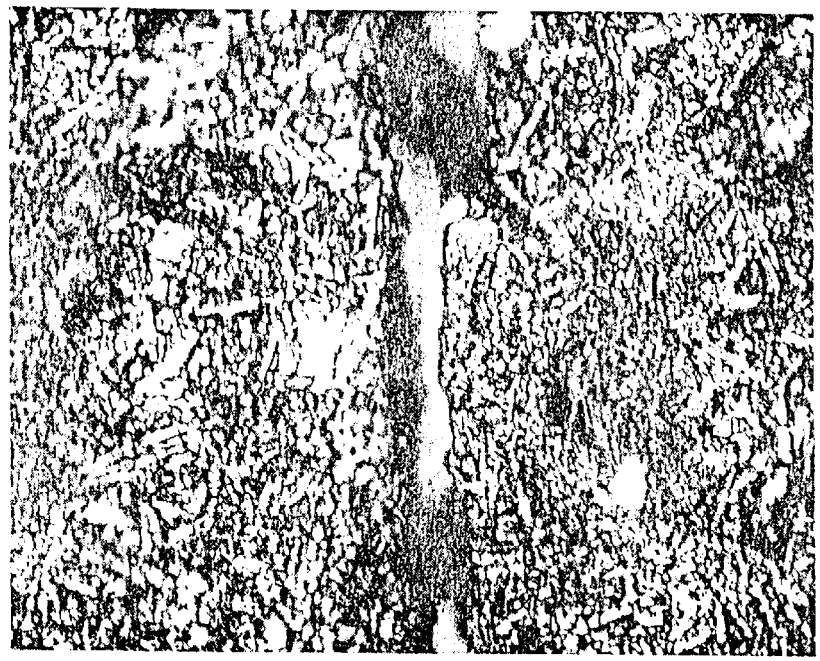
FIG. 5 is a photomicrograph of a section of the solid electroyte of FIG. 4 after it had been repeatedly bent 180° (in half) and straightened to determine the effect of intentionally excessive mechanical abuse.

As shown in FIG. 2, in the solid electrolyte composite formulated in accordance with a preferred embodiment of the present invention, there is a repeating pattern of the underlying diamond structure of the ductile array. EDX analysis of the interface between metal and solid electrolyte ceramic showed a "metal oxide" with the composition $CrNi_2O_x$. The EDX analysis of the metal ligaments was consistent with the published values of Inconel 600 while the bulk ceramic phase was consistent within the precision of the EDX unit with the intended solid solution of bismuth and barium oxides as shown in FIG. 5.

Figure 3:
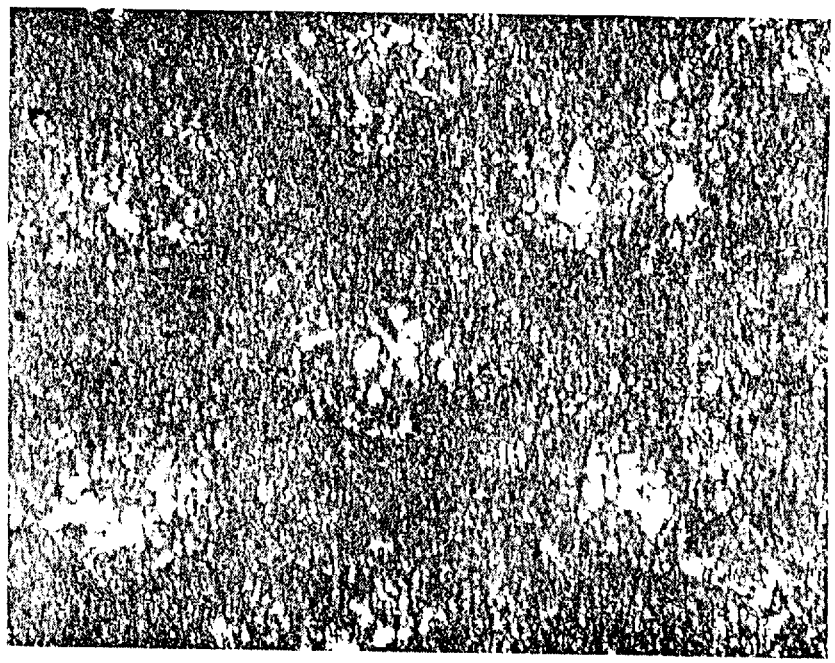
FIG. 3 is a 50× optical photomicrograph of a solid electrolyte composite material in accordance with the practice of this invention.

FIG. 3 is a 50× optical photomicrograph of a composite of this invention. The "diamonds" of ceramic oxide solid electrolyte with the interconnecting lines of metallic ligaments can be seen. Upon backlighting, the composite clearly showed its form with a yellow-orange transmitted light interrupted in a precise regular repeating array of opaque (metallic) lines. The optically transmitting regions were the diamond shaped ceramic filled subsections.

Figure 4:
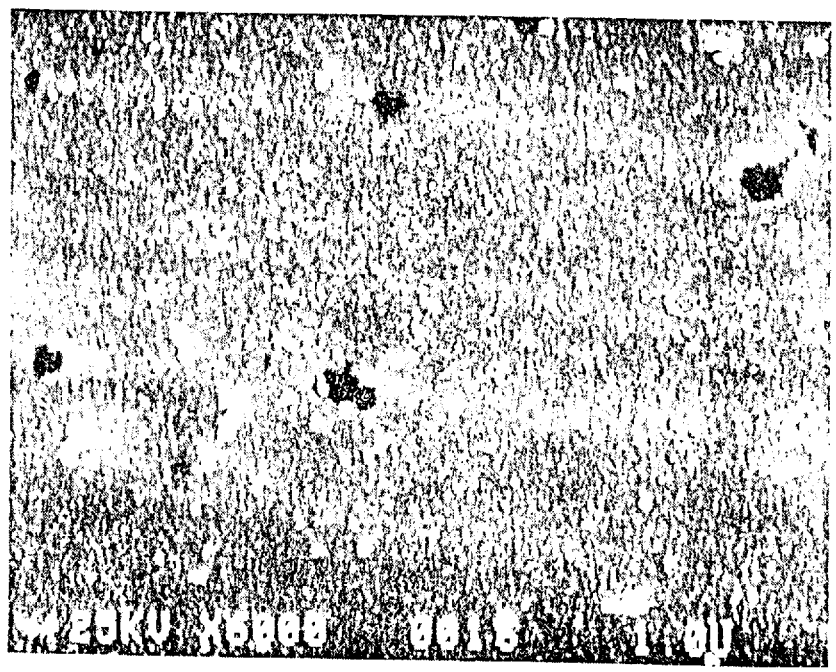
FIG. 4 is a 6000× SEM photomicrograph of a section of a preferred embodiment of a solid electrolyte employed in this invention.

FIG. 4 is a 6000× SEM photomicrograph of a section of the solid electrolyte prepared in accordance with Example 2. The white occlusions are unreacted nearly pure bismuth oxide.

The solid electrolyte composite of this invention was found to be quite flexible, capable of flexing out of plane by as much as 0.25 inch or more with finger tip pressure on a sample of about two inches in length. A sample was repeatedly bent to 180° (folded in half) and straigthened to examine the effect of such mechanical abuse.

FIG. 5 is a photomicrograph of such a sample. As can be seen, despite the extreme mechanical abuse, a resulting crack only formed along the line of maximum stress or fold line. However, there was no crack propagating away from the fold line, and the crack that did appear did not even extend within a given, unsupported ceramic diamond area. The same ceramic composition, outside of the composite structure, would shatter. Prior art composite structures would not withstand such abuse.

Figure 6:
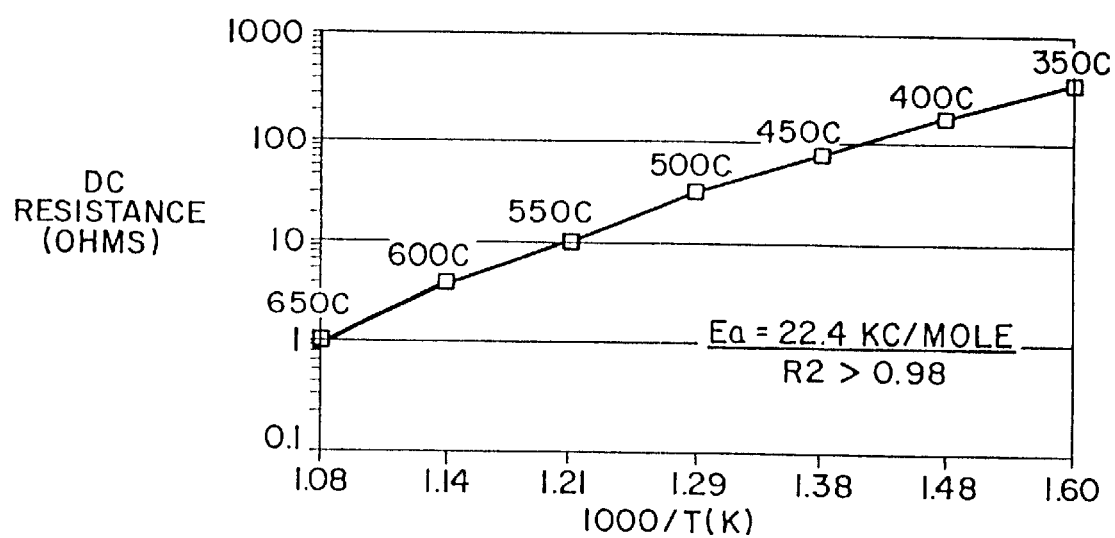
FIG. 6 is a graph of conductivity vs temperature of a solid electrolyte composite using a 15 mole percent baria solution in bismuth oxide.
Figure 7:
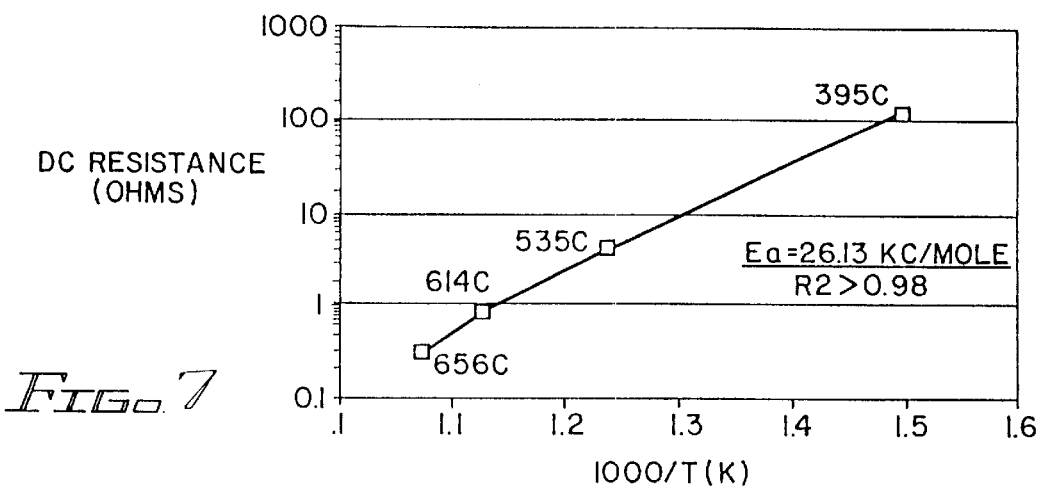
FIG. 7 is a graph of conductivity vs. temperature of a 20 mole percent solution of baria in bismuth oxide.

FIGS. 6 and 7 depict show the DC conductivity versus inverse temperature behavior of composites of this invention having 15 and 20 mole percent of BaO in the ceramic composition phase respectively. Solid electrolytes should exhibit a linear relationship between the log of the conductivity (resistivity) and the inverse Kelvin temperature.

Figure 8:
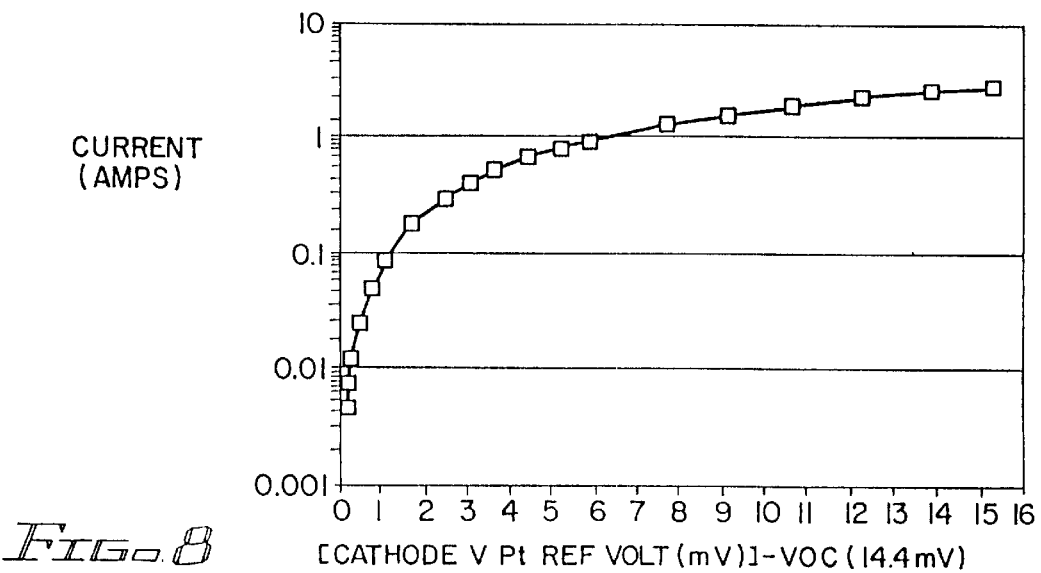
FIG. 8 is a graph of voltage vs. current of the electrolyte of FIG. 7.

FIG. 8 depicts data taken on a solid electrolyte composite of this invention prepared from a 15 mole percent baria (BaO) solution in bismuth oxide ($Bi_2O_3$). The data were taken over a temperature range of three hundred degrees Kelvin and includes the operating temperature range of the oxygen generator of this invention. The slope of the data is about twenty two kilocalories/mole which is consistent with the published literature values for the bulk ceramic. The least squares correlation coefficient for seven data points over the three hundred degree range is >0.98.

Figure 9:
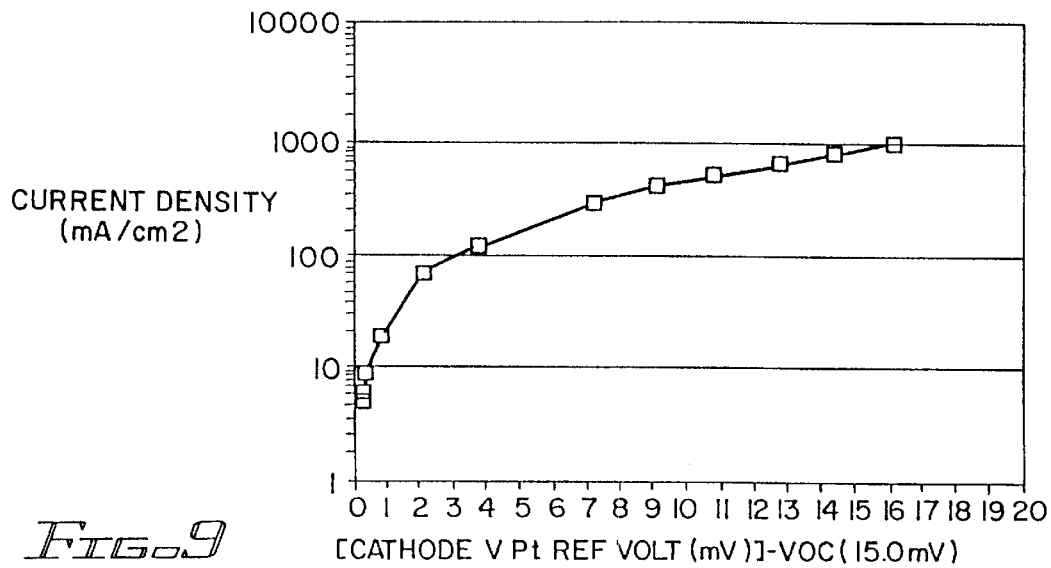
FIG. 9 is a graph of voltage vs. current of the electroyte of FIG. 8.

FIG. 9 is a related data curve taken on a composite produced utilizing a 20 mole percent solution of baria in bismuth oxide. The 15% solid electrolyte showed a small but finite level of the monoclinic phase (by XRD), while the 20% baria solution showed only the pure rhobohedral phase at the precision level of XRD. The 20% curve exhibited a somewhat steeper conducitivy vs. temperature slope than the 15% baria ceramic composite. This results in an energy of activation for the 20% baria material of about 26 KC/mole, slightly higher that the 15% material. At the highest temperature measured, the curve for the 20% baria material may be exhibiting the change in slope as reported by Suzuki [JMS, 20, 1985, 3125] and others for the bulk ceramic.

Figure 10:
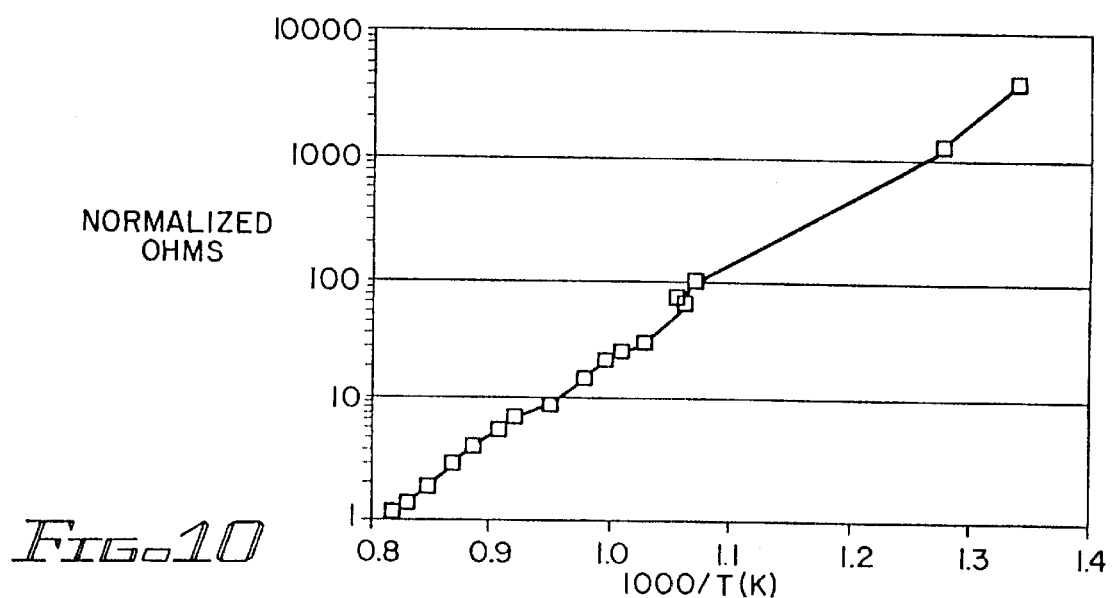
FIG. 10 is a graph of is a graph of the log resistance vs. 1000/T/(K) of a yttria stabilized zirconia composite of the present invention.

FIG. 10 is a graph of is a graph of the log resistance vs. 1000/T/(K) of a yttria stabilized zirconia composite of the present invention.

Generally speaking, the high melting temperature electrolyte composites employed in the practice of this invention are prepared by preparing a slurry of fine metal oxide powder having a particle size under 1 micron to form a doughy slurry, adding an organic binder, preferably under 0.25% of a binder such as polyvinylalcohol, pouring or otherwise distributing the ceramic phase solution over the ductile support array to be embedded therein, firing in a reducing or inert atmosphere to approximately 1000° to 1400° C., preferably 1200° to 1350° C. and most preferably 1300° to 1350° C. for from 1 to 24 hours, cooling and repeating the cycle until there is >90% density in the ceramic.

It is especially preferred to anneal the composite under a directed energy source such as a carbon dioxide laser or electron beam. In this way, the ceramic can be heated above its melting point, permitting it to flow evenly around the ductile array, while the metal remains under its melting point. Beam rastering rates of approximately 1 inch/sec work especially well.

The following examples further illustrate the invention.

EXAMPLE 1

A slurry of a molten hydrate melt of $(CeNO_3)_3 \cdot 6H_2O$, $Gd(NO_3)_3 \cdot H_2O$ and $Ce_{0.8}Gd_2O_{1.9}$ was applied to Inconel 600 mesh (60 mesh) high nickel steel, suspended in a furnace with 0.008 inch Inconel wire and fired to approximately 650° C. After cooling, the composite was laser annealed using a $CO_2$ laser having a 10.6 wavelength, 600 W, ⅜ inch by 0.005 inch. The ceramic melted, flowed and refroze without melting the metal suport matrix. The annealing was done under flowing argon. A sample of composite was held on a computer controlled table and rastered under the $CO_2$ laser beam at a rate of 1 inch/sec. Very slow rates vaporized the sample and faster rates insufficiently melted the ceramic.

EXAMPLE 2

A bismuth baria solid electrolyte composite wherein the ceramic phase contains 20 mole percent baria was prepared as follows.

Bismuth oxide ($Bi_2O_3$, 150 g) was mixed with $Ba(NO_3)$ (11.7 g) and Bi 203 (21 g )$(Bi_2O_3)_{0.72}(BaO)_{0.28}$ and poured into an alumina tray containing 340 g of 16% BaO. Upon melting, the final composition is $(Bi_2O_3)_{0.80}(BaO)_{0.20}$. The mixture was well stirred and heated to a temperature of 900° C. for about 1½ hours, then cooled to 860° C. A ductile array of Inconel 600 expanded metal foil having a line-of-sight openess of about 70% and forming a regular, structured, repeating diamond pattern was preoxidized by heating to approximately 700° C. for about 1½ hours in air. The preoxidized metal support or ductile array was dipped into the liquid ceramic phase to coat the ductile array with the ceramic phase, cooled and annealed at a temperature of 780° C.

EXAMPLE 3

On a 90 mm diameter Buchner funnel was placed a sheet of Whatman 541 filter paper. The funnel assembly was covered with a ⅛ inch thick neoprene gasket sheet having a 90 mm diameter. The neoprene gasket had a rectangular hole somewhat smaller than the composite sample. A second piece of rubber neoprene was placed in the hole on top of the Whatman 541 sheet to physically support the composite without sealing. The system, without a composite sheet, was wetted with ethanol and allowed to set. The composite prepared above was placed over the neoprene hole and sealed in place with a neoprene gasket.

A thin layer of the above bismuth baria as a slurry was painted on and allowed to dry for about 5 minutes. The sample was dried at 60° C., recoated on the opposite side and dried again. The composite was then fired at 700° C. in air for about 20 hours. A second coat of the bismuth baria slurry was applied and the composite fired at 700° C. for 15 hours in air. A third coat was applied and fired at 700° C. in air for 1 week.

EXAMPLE 4

A solid electrolyte composite was prepared following the method of Example 3 with the following modifications. The surface of the composite was painted with a slurry of BiBaOx and 20% polyethyleneimine (50% aqueous) under suction in a Buchner funnel. The composite was dried at 125° C., the opposite side coated and dried as above. The composite was placed under a weight and fired in air at 680° C. for 20 hours, cooled to room temperature and both sides were painted with 1% aqueous polyethylenimine and partially dried. Both faces of the composite were painted with silver palladium paint and dried at 150–200° C. A second coat of silver palladium paint was applied and the composite fired at 350° C. for 1 hour in air and cooled to room temperature. The composite cell was placed in a furnace under a weight and the temperature raised to 700° C., held for 10 minutes, reduced to about 550° C., and then heated in air at 700° C. for 14 hours.

EXAMPLE 5

A cell body was constructed from a section of standard schedule 40 three inch SS316 pipe with external standard threads cut in one end. A planar disc of Inconel 600 expanded metal foil was tack welded on the end without the threads. The expanded foil disk was five inches in diameter. The outer one inch was cut radially into tabs approximately 0.5 inch centered over the unthreaded end of the pipe section and the tabs were bent down over the exterior sides of the pipe. The tabs were tacked in place with five welds of approximately 1/16 inch in diameter arranged in a three/two pattern with the three at the far (wider) end of the tab. Additional welds were tacked every two or three mm along the upper rim of the pipe at approximately ⅛ in intervals.

Following the method of Example 2, a ceramic phase of bismuth baria oxide solid solution was prepared and melted in an Inconel 600 deep drawn crucible. The crucible was placed in an oven and heated to 925° C. for about 30 minutes. The crucible was periodically swirled to insure a chemically homogeneous melt and the temperature was reduced to approximately 850° C.

During the 30 minute thermal hold of the above procedure, the cell body was placed in the oven along side the crucible to heat it to the temperature of the melt. This is important because if cold metal is dipped into the melt, the relatively large thermal mass of metal cools the melt to below the solidus temperature which results in the melt freezing and the pipe section fusing to the frozen ceramic mass. It generally requires a minimum of 30 minutes to raise the metal to the appropriate temperature.

The furnace door was opened and the metal section grasped with long tongs and dipped into the open-topped crucible containing the melt. The cell was promptly removed from the furnace and placed on a concrete surface to cool. The composite top of the cell cooled to room temperature within seconds, although the pipe section took several minutes to cool. The cell unit was examined for pinholes and none were found.

Silver palladium paste was applied to the interior and exterior surfaces of the composite. The paste was dried at 110° C. for 20 minutes and fired at 700° C. for an additional thirty minutes. Several coats were applied using this procedure.

The room temperature electrical resistance between the interior coat (the anode, oxygen evolution site) and the exterior coat (the cathode, the oxygen dissolution site) was >30,000,000 ohms, the limit of the DMMs. This indicates the electrodes were not short-circuited. Electrical resistance between any two points on a given electrode at room temperature was about 0.2 ohms or less.

The exterior electrode was approximately two inches in diameter and did not make direct electrical contact with the pipe. The silver paste of the interior electrode was intentionally spread onto the interior walls of the pipe, making an electrical connection between the housing and the interior electrode. There was no measurable room temperature electrical conductivity between the pipe and the exterior electrode.

A SS316 reducing union piece was then threaded onto the open end of the pipe section using high temperature thread sealant. The small end of the reducing union was connected to 1/8 inch stainless steel tubing using a SS 316 swagelock adapter. The 1/8" tubing extended out of a hole in the top of the furnace. About 18 inch of small diameter tubing extended out of the furnace. The "cold" end of the SS tube was connected to a section, about 3 feet long, of standard 1/8 inch i.d. Tygon tubing. This was the gas circuit.

When electrical power was applied to the cell, at temperatures of about 650° C., oxygen was produced at the anode. This was detected by immersing the end of the tygon tubing in a small dish of water and seeing a steady stream of bubbles. In the absence of electrical power, the flow of oxygen gas (bubbles) ceased.

EXAMPLE 6

An aqueous slurry of fine $ZrO_{2.91}Y_2O_3$ powder +0.25% polyvinylacetate was laser annealed using a $CO_2$ laser having a 10.6 wavelength, 600 W, 3/8 inch line, 0.005 inch. The ceramic melted, flowed and refroze without melting the metal support matrix. The annealing was done under flowing argon. A sample of composite was held on a computer controlled table and rastered under the $CO_2$ laser beam at a rate of 1 inch/sec. Very slow rates vaporized the sample and faster rates insufficiently melted the ceramic.

EXAMPLE 7

The slurry of Example 1 was painted onto Inconel 600 stainless steel foil and dried at 115° C. for 20 minutes. The sample was suspended in a 2" O.D. mullite furnace tube in a silicon carbide heating element furnace, was flushed with argon and the argon flow left on. The temperature was raised at 5° C. per minute to 1340° C. for 3 hours and cooled to room temperature at 5° C. per minute. The procedure was repeated two more times. On the last slurry application the slurry was sucked into pores of the composite under vacuum on a Buchner funnel. The last firing was for 15 hours to density.

The solid electrolyte composite of this invention has a number of applications. It may be fabricated into cells for gas separation systems such as oxygen or nitrogen generator systems. It may also be fabricated into cells for solid oxide fuel cells.

The invention claimed is:

1. A solid electrolyte composite which is non-brittle in practical use comprising: an ionically conductive ceramic matrix and a ductile metallic phase extending throughout the body of said ceramic matrix, said ductile metallic phase of said composite comprising a continuous, interconnected, ordered, repeating ductile metallic array forming a repeating pattern structure, said ductile metallic array embedded within, surrounded by, supporting and in intimate contact with said ceramic body substantially throughout the composite body so as to provide a high degree of interface between the ceramic and metallic array resulting in a ceramic composite which is non-brittle in practical use.

2. The composite of claim 1 wherein said ductile metallic array has an aspect ratio of a two-dimensional planar array.

3. The composite of claim 1 wherein said ductile metallic array is a two-dimensional planar array of continuous fibers arranged to form a regular, repeating pattern.

4. The composite of claim 3 wherein said planar array forms a diamond-shaped, regular repeating pattern.

5. The composite of claim 1 wherein said ductile metallic array has an aspect ratio of a three-dimensional array.

6. A non-brittle solid electrolyte composite comprising: an ionically conductive ceramic matrix and a ductile metallic phase extending throughout the body of said ceramic matrix, said ductile metallic phase of said composite comprising a continuous, interconnected, ordered, repeating ductile metallic array forming a repeating pattern structure, said ductile metallic array is embedded within, surrounded by, supporting and in intimate contact with said ceramic body substantially throughout the composite body so as to provide a high degree of interface between the ceramic and metallic array resulting in a ceramic composite which is non-brittle in practical use and having a thickness of 0.01 inches or less.

7. The composite of claim 6 wherein said ductile metallic array has a thickness of 0.003 inches or less.

8. A non-brittle solid electrolyte composite comprising: an ionically conductive ceramic matrix of one of the following groups of solid oxide electrolytes: zirconia oxide, bismuth oxide, ceria oxide, hafnia oxide, titania oxide, samaria oxide, yttria oxide, cerbia oxide, scandia oxide, calia oxide, magnesia oxide, or gadolinia oxide; and a ductile metallic phase of one of the following groups of metals: stainless steels, iron based alloys, cobalt based alloys or nickel based alloys or superalloys, said ductile metallic phase extending throughout the body of said ceramic matrix, said ductile metallic phase of said composite comprising a continuous, interconnected, ordered, repeating ductile metallic array forming a repeating pattern structure, said ductile metallic array having thickness of 0.003 inches or less and which is embedded within, surrounded by, supporting and in intimate contact with said ceramic body substantially throughout the composite body so as to provide a high degree of interface between the ceramic and metallic array resulting in a ceramic composite which is non-brittle in practical use and which has a thickness of 0.01 inches or less.

9. The composite of claim 1 having a logarithmic relationship between the composite ionic resistivity and the inverse of the Kelvin temperature.

* * * * *